(12) United States Patent
Gardner

(10) Patent No.: US 9,780,974 B2
(45) Date of Patent: Oct. 3, 2017

(54) BROADBAND POWER COUPLING/DECOUPLING NETWORK FOR PODL

(71) Applicant: Linear Technology Corporation, Milpitas, CA (US)

(72) Inventor: Andrew J. Gardner, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 316 days.

(21) Appl. No.: 14/681,529

(22) Filed: Apr. 8, 2015

(65) Prior Publication Data

US 2015/0295735 A1 Oct. 15, 2015

Related U.S. Application Data

(60) Provisional application No. 61/977,299, filed on Apr. 9, 2014.

(51) Int. Cl.
| | |
|---|---|
| *H02J 1/00* | (2006.01) |
| *H04L 25/02* | (2006.01) |
| *H04L 12/10* | (2006.01) |
| *G06F 13/40* | (2006.01) |
| *H04L 12/40* | (2006.01) |
| *H02H 9/00* | (2006.01) |

(52) U.S. Cl.
CPC ...... *H04L 25/0274* (2013.01); *G06F 13/4072* (2013.01); *H02H 9/008* (2013.01); *H04L 12/10* (2013.01); *H04L 12/40045* (2013.01); *H04L 25/0266* (2013.01)

(58) Field of Classification Search
CPC . H04L 25/0274; H04L 25/0266; H04L 12/10; H04L 12/40045; G06F 13/4072
USPC ......................................................... 307/1–8
See application file for complete search history.

(56) References Cited

U.S. PATENT DOCUMENTS

| | | | |
|---|---|---|---|
| 2009/0327558 A1 | 12/2009 | Landry et al. | |
| 2010/0111201 A1* | 5/2010 | Sakai | H04B 3/548 |
| | | | 375/257 |

FOREIGN PATENT DOCUMENTS

| | | |
|---|---|---|
| EP | 1883179 A1 | 1/2008 |
| WO | 00-64099 A2 | 10/2000 |

OTHER PUBLICATIONS

PCT/US15/25133, EPO as ISA, "International Search Report and Written Opinion", dated Jul. 14, 2015, 12 pages.

* cited by examiner

*Primary Examiner* — Thomas Skibinski
(74) *Attorney, Agent, or Firm* — Patent Law Group LLP; Brian D. Ogonowsky

(57) ABSTRACT

A Power Over Data Lines (PoDL) system includes Power Sourcing Equipment (PSE) supplying DC power and Ethernet data over a single twisted wire pair to a Powered Device (PD). The PSE supplies the DC current and AC data through a cascaded coupling network including a series of AC-blocking inductor stages having different inductances to substantially filter out the AC component and pass the DC component. The data is supplied to the wires via capacitors. The PD may have a matched decoupling network for providing the separated DC power and data to a PD load.

8 Claims, 3 Drawing Sheets

BROADBAND POWER COUPLING/DECOUPLING NETWORK FOR PODL

CROSS-REFERENCE TO RELATED APPLICATIONS

This application claims priority to US provisional application serial no. 61/977,299, filed Apr. 9, 2014, by Andrew J. Gardner.

FIELD OF THE INVENTION

This invention relates to Power over Data Line (PoDL) systems, where DC power is transmitted over differential data lines. The invention more particularly relates to a broadband network for such systems that couples the DC power and AC data to a twisted wire pair at the Power Sourcing Equipment (PSE) and decouples the DC power and AC data from the twisted wire pair at the Powered Device (PD).

BACKGROUND

In PoE, limited power is transmitted to Ethernet-connected equipment (e.g., VoIP telephones, WLAN transmitters, security cameras, etc.) from an Ethernet switch. In one type of PoE system, called PoDL, DC power from the switch is transmitted over a single twisted wire pair. The same twisted wire pair also transmits/receives differential data signals. In this way, the need for providing any external power source for the PDs can be eliminated. The standards for PoE and PoDL are set out in IEEE 802.3 and are well-known.

FIG. 1 illustrates conventional coupling/decoupling networks between a PSE 10 and a PD 12 in an Ethernet PoDL system. The PSE 10 is represented as a DC voltage source, but also may include a differential data transmitter or transceiver. The differential data may also be generated by any other circuit. The PD 12 is represented by a load that receives the DC voltage, and the PD 12 may include any circuitry that receives the differential data over the wire pair 14.

In the example of FIG. 1, DC power is delivered from the PSE 10 to the PD 12 through a single twisted wire pair 14 via a coupling network that conducts DC (or low frequency current), for power, between a DC voltage source and the wire pair 14, while simultaneously blocking the differential AC data (or high frequency current) from the DC voltage source. Similarly, the PD 12 uses a decoupling network that decouples the transmitted DC voltage for powering a PD load, while conducting only the PHYs' AC data to data terminals in the PD 12. The ability of the coupling/decoupling networks to block the PHYs' AC data over a very broad range of frequencies is a key requirement for PoDL Ethernet applications where the data rates may vary from less than 10Mbps to greater than 1Gbps. In the example of FIG. 1, the capacitors C1-C4 are intended to block DC in the data path, while the inductors L1-L4 are intended to block AC in the power path.

In FIG. 1, inductors L1-L4 are used to couple/decouple the DC flowing between the PSE 10 voltage source and the PD 12 load to/from the wires 14. The inductors L1-L4 are AC blocking devices whose impedance is proportional to frequency. The constant of proportionality is referred to as the inductance L. Because of parasitic capacitance between the two terminals of each inductor, the impedance may reach a maximum at a self-resonant frequency and then begin to decrease as frequency increases. The self-resonant frequency (SRF) can be expressed as SRF = $1/\{2\pi\sqrt{(LC_{parasitic})}\}$ where $C_{parasitic}$ is the parasitic intra-winding capacitance of the inductor.

The ability of a single inductor to impede AC over a broad range of frequencies depends on the magnitude of inductance, the inductor's ability to conduct DC current without losing its inductance, and its parasitic capacitance. Because of the broadband nature of the digital data being transmitted between the PHYs of the PSE and PD, it may not be possible for a single inductor to maintain enough impedance in shunt with the PHYs' terminations over the required bandwidth, resulting in insufficient return loss at the wire pair connector.

The problem of passing DC while blocking AC in the power path over a broad bandwidth has been addressed with RF diplexers and bias tees, but these devices are designed for unbalanced coaxial transmission lines and hence are unsuitable for PoDL applications, which rely upon unshielded, balanced, twisted pair data lines. Such unsuitable broadband bias tees make use of cascaded inductors with the requisite snubbing, thus overcoming the limitations of a single inductor's SRF in order to deliver sufficient broadband shunt impedance.

FIG. 2 illustrates a 4 stage broadband bias tee 20 found in contemporary literature, which is unsuitable for PoDL using unshielded twisted wire pair.

For PoDL applications, a fully balanced topology is required.

Thus, what is needed in the field of PoDL is an improved coupling/decoupling network that combines or separates the DC power and wide bandwidth AC data with suitably large return loss.

SUMMARY

A fully balanced coupling/decoupling network for a PSE or PD in a PoDL network is described, where a DC channel (for power) and an AC channel (for data) are simultaneously transmitted over a single twisted wire pair. The AC channel may require a very broad bandwidth, and the return loss should be suitably large for the required bandwidth. A high return loss results in a low insertion loss.

In the example of the coupling network used for a PSE for coupling DC and AC onto a single twisted wire pair, a cascaded network of AC-blocking stages may be used. The circuit may be the same for both wires in the pair.

In one example, the positive DC voltage (for power) is applied to a 33 microhenry (uH) inductor. This is followed by a 1 uH inductor. Each inductor has a parasitic capacitance, which undesirably can create a self-resonating circuit at a self-resonant frequency SRF. The SRF for the 1 uH inductor is much higher than that for the 33 uH inductor. An identical circuit is coupled between the negative DC voltage and the other wire. Between the two wires, at the junction of the 33 uH and 1 uH inductors, is connected a resistor and capacitor connected in series to damp out resonant interaction between the inductors. The opposing inductors for the two wires may be wound around a common core in order to enhance circuit balance and conserve core material. Additional inductor stages having progressively reduced inductances may be added for increasing the AC channel's bandwidth with the necessary return loss.

The PHY's AC data is applied to each wire via an AC coupling capacitor.

The PD may have a similar decoupling network for separating out the DC and AC for application to the PD load.

In contrast to this cascaded network using two or more inductors in series (each having a different SRF), the prior art (e.g., FIG. 1) uses only a single inductor.

The cascaded network creates a very wide bandwidth AC coupling/decoupling network with suitably large return loss.

Different values of the capacitors, inductors, and resistors may be used depending on the optimal requirements of the PoDL system.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

Elements that are the same or equivalent are labeled with the same numeral.

DETAILED DESCRIPTION

Figure 1:
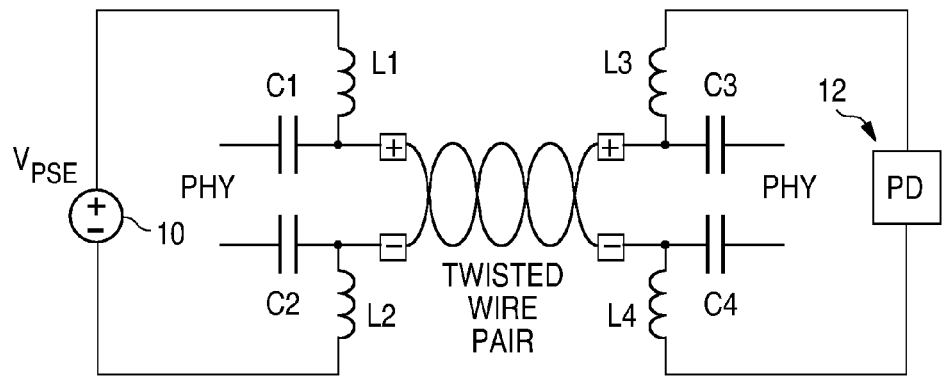
FIG. 1 illustrates a conventional PoDL-enabled Ethernet system using a single wire pair for supplying power and data to the PD.
Figure 2:
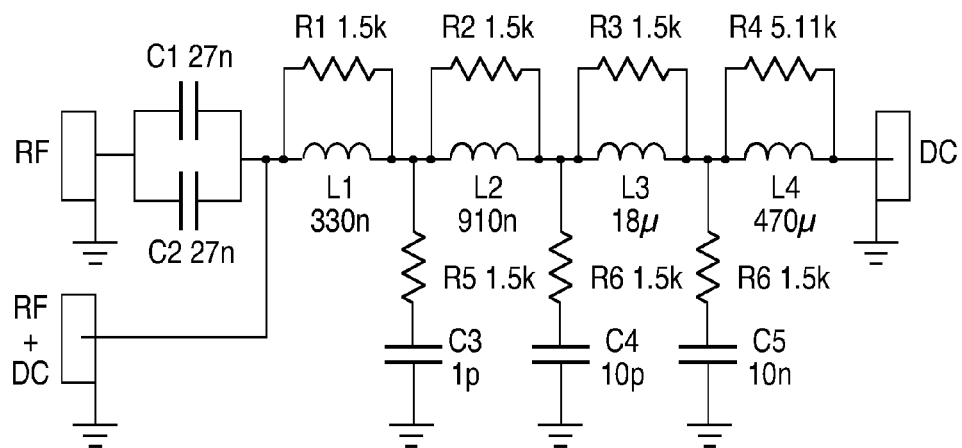
FIG. 2 illustrates a known 4 stage broadband bias tee for use with coaxial cables, which is unsuitable for PoDL using a twisted wire pair.
Figure 3:
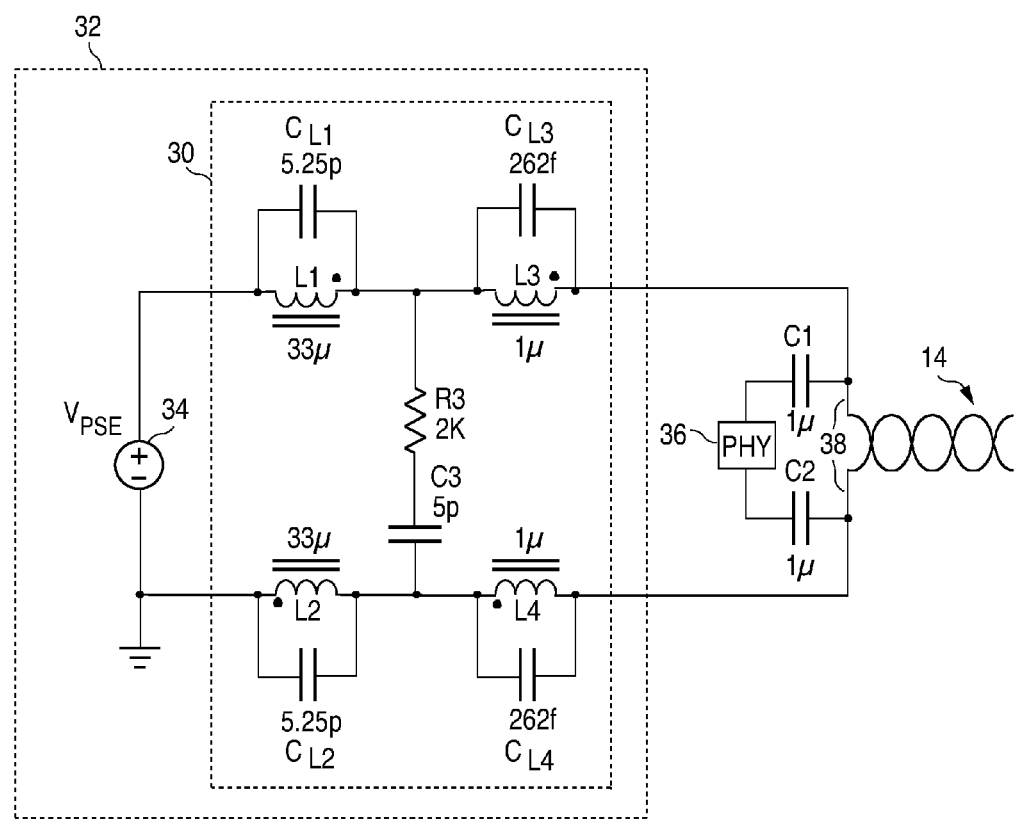
FIG. 3 illustrates a cascaded coupling network for a PSE for coupling DC (power) and wide bandwidth PHY AC data to a twisted wire pair, in accordance with one embodiment of the invention.

FIG. 3 illustrates a cascaded coupling network 30 in a PSE 32 for coupling a DC power signal (e.g., 12 volts), generated by a DC voltage source 34, to a twisted wire pair 14, and for also coupling a differential AC data signal, generated by the PHY 36, to the wire pair 14. The PHY 36 includes a differential data transceiver that generates and receives the AC data at any frequency within the bandwidth of the system. Such transceivers may be conventional and need not be described. The DC signals are blocked from the PHY 36, and the AC signals are blocked from the DC source. The polarities of the signals may be the opposite shown since the circuitry is the same for each wire.

Along the top conductor path, which may include printed circuit board traces or wires, the positive DC voltage (relative to the other DC voltage terminal) is applied to a 33 uH inductor L1, which may have, for example, a parasitic capacitance $C_{L1}$ of 5.25 pF (picofarad). Downstream from the inductor L1 is a 1 uH inductor L3, which may have, for example, a lower parasitic capacitance $C_{L3}$ of 262 fF (femtofarad). The self-resonant frequency (SRF) for the inductor L3 is much higher than that of the inductor L1.

Along the bottom wire, which may include printed circuit board traces or wires, a circuit that is a minor image of the top wire circuit is provided. The mirrored inductors may have a common core to increase inductance and improve matching for better rejection of common mode current. Specifically, the negative DC voltage is applied to a 33 uH inductor L2, which may have, for example, a parasitic capacitance $C_{L2}$ of 5.25 pF (picofarad). Downstream from the inductor L2 is a 1 uH inductor L4, which may have, for example, a parasitic capacitance $C_{L4}$ of 262 fF (femtofarad).

A 2 k ohm resistor R3 and 5 pF capacitor C3 are connected in shunt between the inductors L1 and L2 and the inductors L3 and L4 to damp out resonant interaction between the L1-L4 inductors.

The inductors L1-L4 pass the DC voltage. The DC voltage is applied to the twisted wire pair 14 at the output terminals 38 of the PSE 32.

The AC differential data signal, generated by the differential data transceiver in the PHY 36, is AC-coupled to the twisted wire pair 14 via the 1 uF capacitors C1 and C2. The capacitors C1 and C adequately block the DC voltage generated by the DC voltage source 34. The data may be coupled to the capacitors C1 and C2 via termination resistors, if required.

Figure 4:
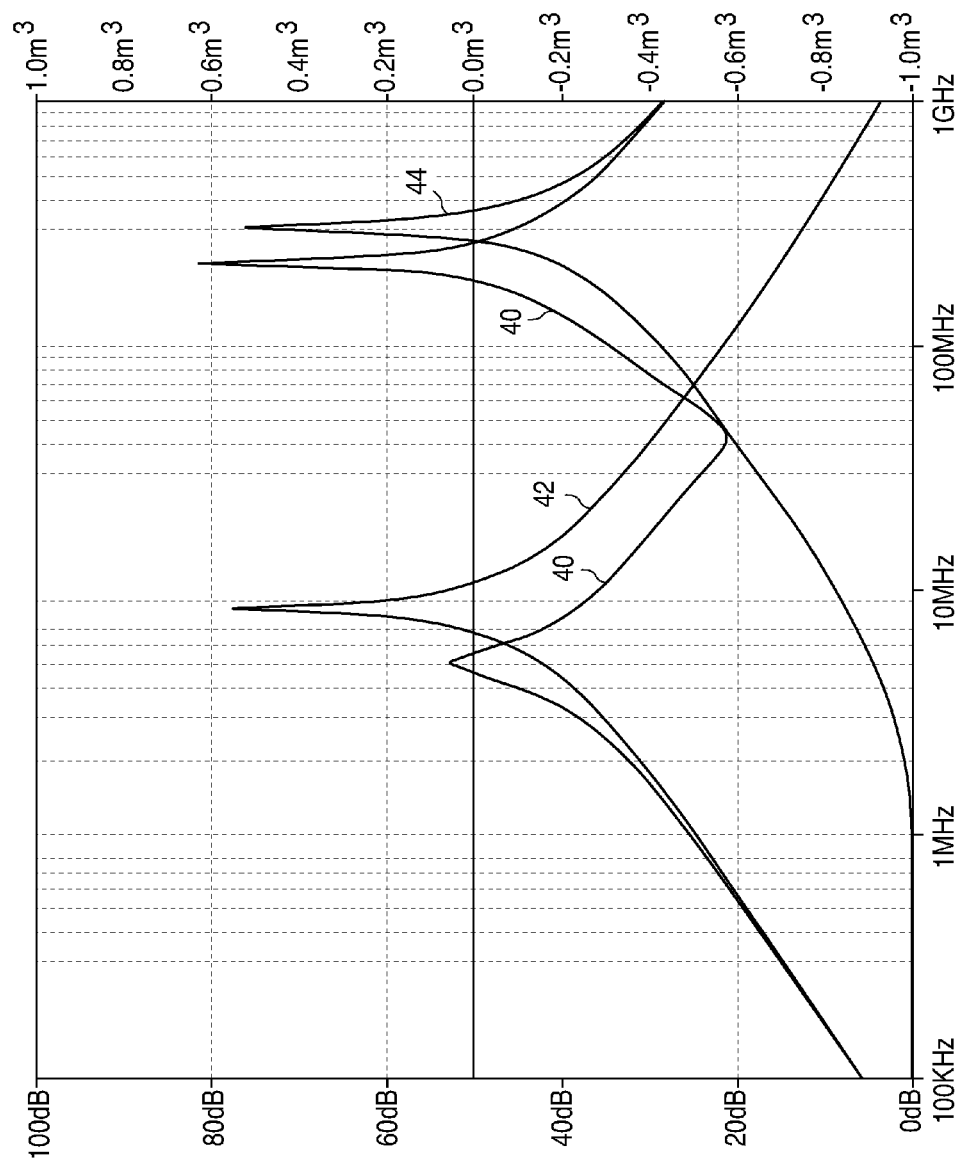
FIG. 4 is a graph, obtained by simulation of the coupling/decoupling network of FIG. 3, showing return loss (with 100 Ωreference impedance) vs frequency.

FIG. 4 is a graph 40 of return loss (in dB with 100 Ωreference impedance) versus the frequency, obtained by simulating the coupling network 30 in the PSE 32. A 20 dB return loss is large, and the graph 40 shows that the data bandwidth of about 1 MHz-1 GHz incurs greater than a 20 dB return loss. In contrast, graph 42 shows what the return loss vs.

frequency would be with only the 33 uH inductor used. Similarly, the graph 44 shows what the return loss vs. frequency would be with only the 1 uH inductor used. The graph 40 represents a much wider range of practical data frequencies.

A PD connected to the wire pair 14 would have a decoupling network with the same components as the coupling network 30, with the DC power terminals of the PD load coupled to the outputs of the inductors L1 and L2 and the differential data terminals of the PD load coupled to the output terminals of the capacitors C1 and C2. The PD includes a differential data transceiver coupled to the capacitors C1 and C2. Termination resistors may be used as needed.

Although the values shown in the figures are considered optimal for a particular application, other values may be optimal for other applications. Although the manufacturer should attempt to perfectly match the inductors for each of the wires for maximum rejection of common mode currents, it is understood that the inductors can only be approximately matched.

Additional AC-blocking stages in the power path with descending inductor values may be connected to the right of the inductor L3/L4 to obtain a wider bandwidth. In one example, each stage has an inductance that is at least 1/10 that of the previous stage.

The small 1 uH inductors L3/L4 may be formed by a trace pattern on a printed circuit board on which the remainder of the network is mounted. Using such traces for the inductor winding may reduce the parasitic capacitance to desirably increase the SRF beyond the highest expected frequency of the data signal.

Where possible, opposing inductor pairs should be wound on a common core in order to conserve core material and improve matching for better rejection of common mode current in the twisted wire pair.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A Power over Data Lines (PoDL) system for supplying power and data over a wire pair, the wire pair being a first wire and a second wire coupled to a powered device, the system comprising:

a DC voltage source having a first voltage source terminal and a second voltage source terminal, where a DC voltage is across the first voltage source terminal and the second voltage source terminal;

a first series combination of two or more inductors having a first terminal coupled to the first voltage source terminal, the series combination of inductors also having a second terminal outputting a first filtered DC voltage for coupling to the first wire, wherein the first series combination comprises a first inductor, having the first terminal, and a second inductor, having the second terminal, wherein the first inductor has a first inductance greater than a second inductance of the second inductor;

a second series combination of two or more inductors having a third terminal coupled to the second voltage source terminal, the second series combination of inductors also having a fourth terminal outputting a second filtered DC voltage for coupling to the second wire, wherein the second series combination comprises a third inductor, having the third terminal, and a fourth inductor, having the fourth terminal, wherein the third inductor has an inductance approximately equal to the first inductance, and wherein the fourth inductor has an inductance approximately equal to the second inductance;

a differential data transceiver having a first data terminal and a second data terminal;

a first capacitor having a fifth terminal coupled to the first data terminal, the first capacitor having a sixth terminal for coupling to the first wire to combine data with the first filtered DC voltage; and a second capacitor having a seventh terminal coupled to the second data terminal, the second capacitor having an eighth terminal for coupling to the second wire to combine the data with the second filtered DC voltage.

2. The system of claim 1 further comprising a third capacitor coupled between the first series combination and the second series combination.

3. The system of claim 2 further comprising the third capacitor, in series with a first resistor, coupled between the first series combination and the second series combination.

4. The system of claim 1 wherein the differential data transceiver is coupled to the first capacitor and the second capacitor via termination resistors.

5. The system of claim 1 further comprising the powered device.

6. The system of claim 5 wherein the powered device is coupled to receive the data and voltage over the first wire and the second wire, the powered device having a decoupling network separating the DC voltage from the data on the first wire and the second wire, the decoupling network comprising inductors matched to the first series combination of two or more inductors and to the second series combination of two or more inductors, the decoupling network also comprising capacitors matched to the first capacitor and the second capacitor.

7. The system of claim 1 where two or more of the inductors in the first series combination and the second series combination are mutually coupled.

8. The system of claim 1 where one or more of the inductors are formed using traces on a printed circuit board.

* * * * *